(12) United States Patent  
Augur

(10) Patent No.: US 7,081,638 B1  
(45) Date of Patent: Jul. 25, 2006

(54) SYSTEM AND METHOD TO IMPROVE UNIFORMITY OF ULTRAVIOLET ENERGY APPLICATION AND METHOD FOR MAKING THE SAME

(75) Inventor: Roderick A. Augur, Hopewell Junction, NY (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 10/971,018

(22) Filed: Oct. 25, 2004

(51) Int. Cl.  
*A61N 5/06* (2006.01)  
*G01J 3/10* (2006.01)  
*H05G 2/00* (2006.01)

(52) U.S. Cl. .............................. 250/504 R; 250/504 R
(58) Field of Classification Search ............ 250/504 R, 250/492.1  
See application file for complete search history.

(56) References Cited

U.S. PATENT DOCUMENTS

| | | | |
|---|---|---|---|
| 4,641,033 A * | 2/1987 | Petelin et al. | 250/492.1 |
| 4,918,704 A * | 4/1990 | Caprara et al. | 372/99 |
| 6,284,050 B1 * | 9/2001 | Shi et al. | 118/715 |
| 6,465,799 B1 * | 10/2002 | Kimble et al. | 250/504 R |
| 6,862,125 B1 * | 3/2005 | Warner et al. | 359/265 |

* cited by examiner

*Primary Examiner*—John R. Lee  
*Assistant Examiner*—Jennifer Yantorno

(57) ABSTRACT

A UV system, such as used in UV curing of dielectric material, for example, and a method of making the same, has a reflector and a localized UV source positioned at an optical center of the reflector. The window separates the UV source from a work piece. The UV source is on a first side of the window and the work piece is on a second side of the window. A partially reflecting mirror is provided on the first side of the window. The partially reflecting mirror, with the reflector and localized UV source, provides for a maximum amount of UV energy to be provided in a uniformly distributed manner across the plane of the window to the work piece.

11 Claims, 3 Drawing Sheets

SYSTEM AND METHOD TO IMPROVE UNIFORMITY OF ULTRAVIOLET ENERGY APPLICATION AND METHOD FOR MAKING THE SAME

FIELD OF THE INVENTION

The present invention relates to the field of ultraviolet energy application, and more particularly, to systems and method for applying ultraviolet energy to a work piece.

There are many industrial and manufacturing processes in which application of UV energy is desirable. For example, in the field of semiconductor fabrication, films with low dielectric constants (low k films) are employed in the backend module to reduce overall capacitance crosstalk. Typically, low k dielectric films are deposited or formed using a spin-on process or a chemical vapor deposition (CVD) process. After the formation of the low k film, a curing process is generally performed to complete the formation of chemical bonds, outgas residual components, and reduced the dielectric constants in the film. This curing process is commonly performed in a furnace using a batch mode or on a hot plate utilizing a single wafer mode. In either case, the conventional cure process undesirably subjects the wafer to an elevated temperature for an extended period of time. In addition to consuming a significant portion of the thermal budget allotted for a particular process, the conventional cure processes require a time consuming manufacturing step that may require the manufacturer to acquire additional processing equipment. To overcome some of these concerns, the use of ultraviolet exposure to effect the cure process has been proposed.

It is desirable to provide UV intensity at the wafer plane as high as possible and uniform across the entire wafer area. This obtains the maximum throughput from the cure process. However, this has proven difficult to achieve with the use of a localized source and a rear reflector.

In addition to the UV curing of dielectric materials, UV systems can be applied to other UV processing needs, such as photoresist hardening (also called "stabilization") and other process.

SUMMARY OF THE INVENTION

There is a need for a UV system that achieves maximum UV intensity at a work piece plane, but also uniformly distributes the UV intensity across the entire work piece plane.

This and other needs are met by embodiments of the present invention which provide a UV system comprising a reflector, a localized UV source positioned at an optical center of the reflector, and a window for separating the UV source from a work piece. This UV source is on a first side of the window and the work piece is on a second side of the window. The UV system also comprises a partially reflecting mirror on the first side of the window.

The partially reflecting mirror and the reflector with the localized UV source positioned at the optical center provide for a partial reflection/transmission arrangement so that the maximum energy can be delivered to the work piece plane in a uniformly distributed manner. The partially reflecting mirror can be configured such that UV energy from the localized UV source is re-reflected off the partially reflecting mirror back onto the reflector and again towards the partially reflecting mirror. In this manner, the UV energy is not dissipated or attenuated, but rather merely re-reflected until eventually passing through the partially reflecting mirror. Proper configuration of the partially reflecting mirror uniformly distributes the UV energy across the plane of the work piece.

The earlier stated needs are also met by other embodiments of the present invention, which provide a method of forming a UV system, comprising the steps of forming a partially reflecting mirror and positioning a localized UV source on a source side of the partially reflecting mirror. The partially reflecting mirror is configured for uniformly distributing UV energy from the localized UV source.

The foregoing and other features, aspects and advantages of the present invention become more apparent from the following detailed description of the present invention when taken in conjunction with the accompanying drawings.

DETAILED DESCRIPTION OF THE INVENTION

The present invention addresses and solves problems related to the application of UV energy to a work piece. In particular, the present invention provides a UV system that produces a maximum UV energy with uniform distribution across a work piece plane. This is achieved, in part, by the use of a partial reflection/transmission approach. A reflector is provided behind a localized UV source, and reflects UV energy towards the partially reflecting mirror, which is formed on a window. The partially reflecting mirror is configured to provide varying reflectivity of UV energy back towards the reflector (re-reflected) so that the UV energy is uniformly distributed on the work piece side of the window. However, since the UV energy is re-reflected from the partially reflecting mirror to the reflector and back through the partially reflecting mirror, the UV energy from a localized UV source is not dissipated or attenuated, but rather is transmitted through the partially reflecting mirror and the window.

Figure 1:
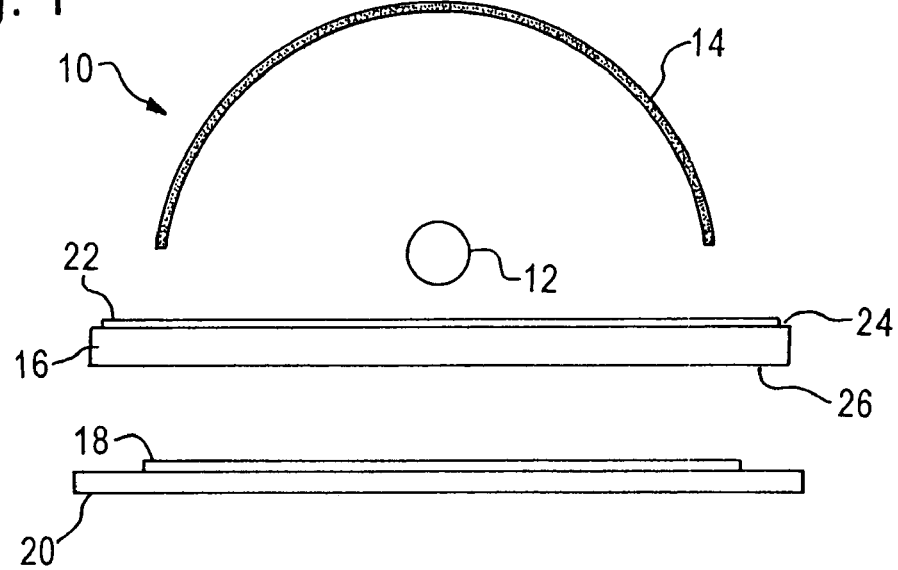
FIG. 1 is a schematic with depiction of a cross-sectional side view of a UV system constructed in accordance with embodiments of the present invention.

FIG. 1 is a schematic cross-sectional side view of a UV system 10 constructed in accordance with embodiments of the present invention. The UV system 10 includes a localized UV source 12 that is positioned at the optical center of a reflector 14 that is behind the UV source 12. A conventional UV source 12 and reflector 14 may be employed with the present invention.

A window 16, made of a UV-transparent material, separates the UV source 12 from a work piece 18. This protects the work piece 18 from contamination, and damage from the occasional catastrophic failure of the UV source 12. The work piece 18, for example, may be a wafer with a dielectric layer to be cured, or having a photoresist material that requires stabilization, etc. The system, however, is not limited to semiconductor manufacturing, but may also be used in other types of UV processing.

The work piece 18 is provided on a work piece support 20. The window 16 includes a partially reflecting mirror 22 formed on the surface side 24 of the window 16. The other side of the window 16 is referred to as the work piece side 26.

The partially reflecting mirror 22 is made by forming a thin layer of a reflective material, such as metal, on the source side 24 of the window 16. The thickness of the metal layer is varied across the surface of the window 16, as will be described. Exemplary materials for the metal of the partially reflecting mirror 22 include aluminum, gold or chromium, for example. However, other metals may be used without departing from the scope of the invention.

As described earlier, it is desirable to provide a uniform distribution of the UV energy on the work piece side 26 of the window 16. Because of the localized UV source 12, the maximum amount of UV energy would normally be provided at the center of the window 16. However, the configuration of the partially reflecting mirror 22 serves to uniformly distribute the UV energy across the plane of the window 16. A schematic depiction of the window 16 and the partially reflecting mirror 22 in cross-section is provided in FIG. 2. In this figure, the thickness of the partially reflecting mirror 22 is greatly exaggerated for illustration purposes.

The thickness of the partially reflecting mirror 22 can vary across the source side 24 of the window 16, and range, for example, from 0 angstroms to about 1000 angstroms. Other thicknesses may be used without departing from the scope of the present invention. As can be appreciated by FIG. 2, when a single localized UV source 12 is provided at the center of the window 16, in order to uniformly distribute the UV energy across the surface of the window 16, the thickest portion of the partially reflecting mirror 22 is also provided at the center of the window 16. This configuration produces a greater reflectivity at the center of the partially reflecting window 22 than at its outer edges. In other words, the reflectivity of the partially reflecting mirror is highest closest to the UV source 12 and decreases with increasing distance from the UV source 12. In certain embodiments, this is achieved, as depicted in FIG. 2, by making the partially reflecting mirror 22 thickest closest to the UV source 12 and thinner with increasing distance from the UV source 12.

Figure 2:
FIG. 2 is a schematic representation of a side view of a window and a partially reflecting mirror constructed in accordance with embodiments of the present invention.

With the configuration of FIG. 2, more UV energy is re-reflected at the center than at the edges of the partially reflecting mirror 22. This produces a substantially uniform distribution of the UV energy as it eventually passes through the partially reflecting mirror 22 and the window 16 towards the work piece 18.

Figure 3:
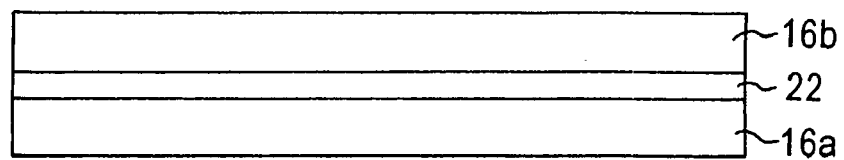
FIG. 3 depicts a cross-sectional side view of another embodiment of the window and partially reflecting mirror in accordance with embodiments of the present invention.

In certain embodiments, during manufacture, the window 16 is split through its thickness. The partially reflecting mirror 22 is then formed on only one part of the mirror 16, and the second part of the mirror 16 is sealed on top of the partially reflecting mirror 22 or bonded together with a mirror 22 in between. In this manner, the partially reflecting mirror 22 is protected from mechanical damage, such as by catastrophic failure of the UV source 12 or cleaning of the window. This embodiment is depicted in FIG. 3, which shows the structure in cross-section with a first portion of the window 16A on which the partially reflecting mirror 22 is formed. The other portion of the window 16B is provided on top of the partially reflecting mirror 22, as described above.

The partially reflecting mirror 22 may be formed any of a number of different ways, a few embodiments of which will be described with respect to FIGS. 4, 5, 6A–6C, 7A–7C and 8.

Figure 4:
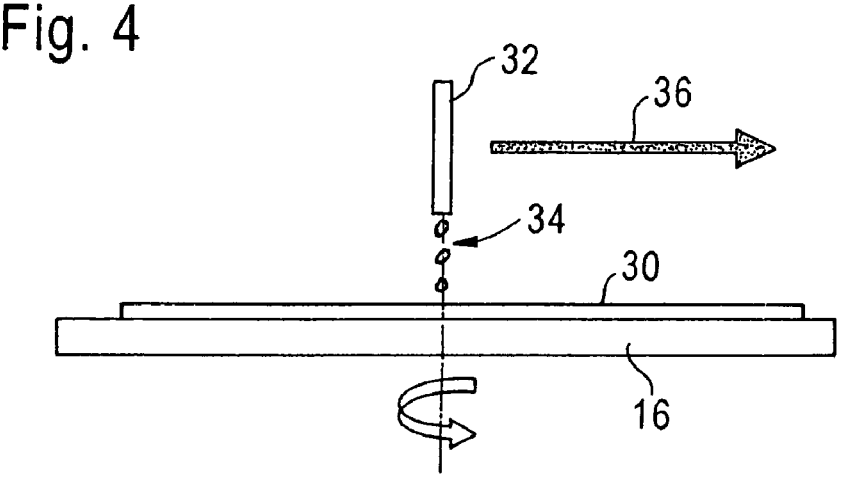
FIG. 4 is a schematic side view showing a method of forming the partially reflecting mirror in accordance with embodiments of the present invention.

In FIG. 4, a metal layer 30 has already been formed to a substantially even thickness on the window 16. A nozzle 32 is employed to dispense etchant 34 onto the surface of the metal layer 30. The etchant 34 is selected so as to etch the metal layer 30 but not the material comprising the window 16. The metal layer 30 is now etched unevenly across the window 16 to vary the thickness of the layer 30 across the window, and form the partially reflecting mirror 22 of FIG. 2. This process involves spinning the window 16 under the nozzle 32 and dispensing the etchant 34 from the nozzle 32 onto the layer 30. The relative position of the nozzle 32 with respect to the window 16 is changed in the direction of the arrow 36. In other words, the nozzle 32 is moved radially from the center of the window 16 to the edge of the window 16. During the etching process, the radial movement of the nozzle 32, the window speed and etch rate are all controlled, thereby controlling the varying of the thickness of the layer 30 across the window 16.

Figure 5:
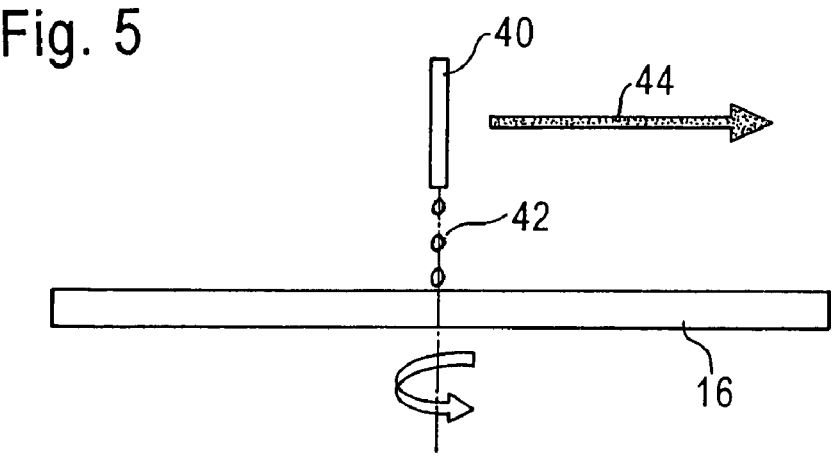
FIG. 5 shows a side view of another method of forming a partially reflecting mirror in accordance with the embodiments of the present invention.

In an analogous embodiment, depicted in FIG. 5, a nozzle 40 is employed to deposit metal 42 onto the surface of the window 16. The metal 42 is sprayed onto the window 16 from the nozzle 40. Like in FIG. 4, the nozzle 40 can be moved from the center to the edge of the window 16 as indicated by arrow 44. By proper control of the nozzle speed, window spin speed and spray rate, the desired metal thickness profile of the partially reflecting mirror 22 can be achieved.

Figure 6A:
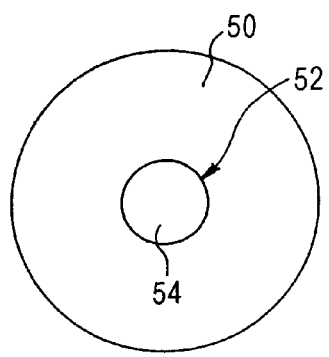
FIGS. 6A–6C depict sequential steps of a partially reflecting mirror formation method in accordance with embodiments of the present invention.
Figure 6B:
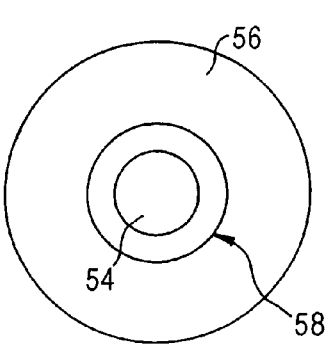
Figure 6C:
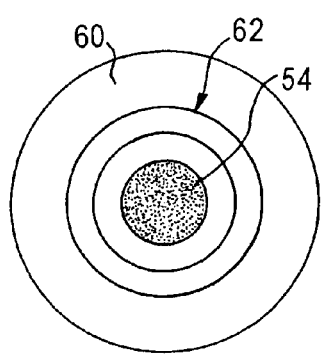
Figure 7A:
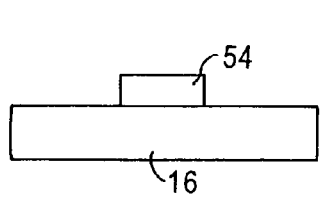
FIGS. 7A–7C depict schematic cross-sectional views of a window and partially reflecting mirror during the sequential steps of FIGS. 6A–6C respectively.
Figure 7B:
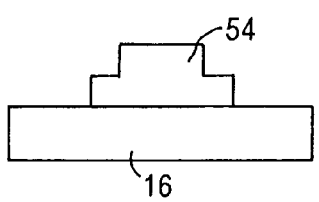

FIGS. 6A–6C and 7A–7C depict the formation of the partially reflecting mirror 22 in accordance with other embodiments of the present invention. In FIG. 6A, the metal on the window 16 is formed by evaporation of metal sequentially through a series of shadow masks with increasingly larger openings. FIGS. 6A–6C show a top view of a shadow mask (the window 16 is obscured by the various shadow masks). For example, in FIG. 6A, the shadow mask 50 has a central opening 52 of a relatively small radius. Evaporation of the metal, such as aluminum, gold or chromium, on the window 16 provides deposition at the center of the window 16. This is depicted in FIG. 7A, which shows the window 16 and the metal layer 54 in cross-section.

In FIG. 6B, a second shadow mask 56 with a larger opening 58 is provided over the window 16 and evaporation of the metal occurs again, to form the metal layer 54. The centermost portion of the metal layer 54 is thickest, since a second evaporation of metal forms additional metal on top of the previously formed metal. In addition, the larger radius of the opening 58 in the shadow mask 56 provides for evaporation of the metal in a wider radius on the window 16. Hence, the thickness of the metal 54 is greatest in the center (thereby providing maximum reflectivity at the center), and thinner with increasing distance from the center of the window 16.

Figure 7C:
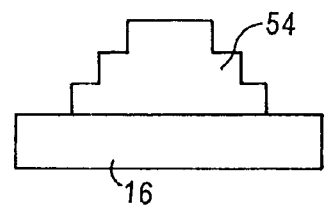

FIG. 6C shows a third shadow mask 60 with an opening 62 of even greater radius than the opening 58 in the second shadow mask 56. Evaporation of metal again forms more metal at the center, and also provides metal at the surface of the window 16 at a still greater distance from the center of the window 16. The results of the evaporation are depicted in FIG. 7C.

In certain embodiments, the masks 50, 56 and 60 are separated from the plane of the window 16. This blurs the edges of the deposited regions so that transitions from one region to another will be more gradual than that schematically depicted in FIGS. 7A–7C. The use of a series of shadow masks provides a partially reflecting mirror 22 with varying reflectivity over the surface of the partially reflecting mirror 22, caused by varying the thickness of the metal layer.

Figure 8:
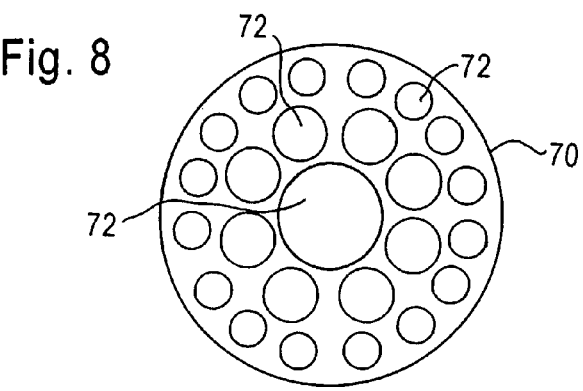
FIG. 8 is a schematic depiction of a shadow mask constructed in accordance with embodiments of the present invention.

Still another embodiment for forming the metal layer 22 is depicted in FIG. 8, which provides a mask 70 comprising a large number of openings 72. These openings 72 are centered on a regular grid. The size of the openings 72 are smaller than the grid spacing, with the grid spacing being much smaller than the characteristic distance over which the metal reflectivity needs to vary. As depicted in FIG. 8, the size of the openings 72 is varied to adjust the average area covered by metal, averaged over an area smaller than the characteristic distance over which the metal reflectivity must vary. In other words, as depicted in FIG. 8, larger openings 72 are provided near the center of the mask 70 so that the amount of metal provided at the center of the partially reflecting mirror 22 on the surface of the window 16 will be greater at the center. A smaller amount of metal will be deposited through the smaller openings 72 as the distance increases from the center. This changes the reflectivity of the partially reflecting mirror 22 as a function of distance from the radial center.

Other methods of forming the partially reflecting mirror 22 may be employed without departing from the scope of the present invention.

The present invention thus provides a UV system and method for making the same that employs a partial reflectivity/transmission approach to provide a maximum amount of UV energy and uniform distribution of this energy to a work piece.

Although the present invention has been described and illustrated in detail, it is to be clearly understood that the same is by way of illustration and example only and is not to be taken by way of limitation, the scope of the present invention being limited only by the terms of the appended claims.

What is claimed is:

1. A UV system comprising:
   a reflector;
   a localized UV source positioned at an optical center of the reflector;
   a window for separating the UV source from a work piece, the UV source being on a first side of the window and the work piece on the second side of the window; and
   a partially reflecting mirror on the first side of the window configured and positioned to re-reflect UV energy to the reflector and back through the partially reflecting mirror.

2. The UV system of claim 1, wherein the partially reflecting mirror has a varying reflectivity over the surface of the partially reflecting mirror.

3. The UV system of claim 2, wherein the reflectivity of the partially reflecting mirror varies as a function of distance from the UV source.

4. The UV system of claim 3, wherein the reflectivity of the partially reflecting mirror is highest closest to the UV source and decreases with increasing distance from the UV source.

5. The UV system of claim 4, wherein the partially reflecting mirror comprises a layer of metal on the window.

6. The UV system of claim 5, wherein the layer of metal is thickest closest to the UV source and is thinner with increased distance from the UV source.

7. The UV system of claim 1, further comprising another window, contacting the partially reflecting mirror, such that the partially reflecting mirror is between the windows.

8. The UV system of claim 1, wherein the UV energy on the second side of the window is substantially uniformly distributed across the window.

9. The UV system of claim 8, wherein the partially reflecting mirror has a varying reflectivity over the surface of the partially reflecting mirror.

10. The UV system of claim 9, wherein the partially reflecting layer comprises a layer of metal on the window.

11. The UV system of claim 10, wherein the layer of metal has a varying thickness across the surface of the window.

* * * * *